United States Patent [19]
Long, Jr.

[11] 3,975,325
[45] Aug. 17, 1976

[54] ANTISTATIC AGENT COMPOSITION

[75] Inventor: William Penuel Long, Jr., Wilmington, Del.

[73] Assignee: ICI United States Inc., Wilmington, Del.

[22] Filed: Aug. 27, 1973

[21] Appl. No.: 391,543

[52] U.S. Cl. .............. 260/23 XA; 252/8.8; 260/DIG. 16; 526/5; 526/6; 526/344; 526/345
[51] Int. Cl.² .............. C08F 6/26; C08F 14/06
[58] Field of Search ............ 252/8.8, 45.75 W; 260/DIG. 16, 18, 23 XA, 92.8 A

[56] References Cited
UNITED STATES PATENTS

| | | | |
|---|---|---|---|
| 2,992,199 | 7/1961 | Coler | 260/23 |
| 3,288,748 | 11/1966 | Cyba | 260/45.9 |
| 3,349,059 | 10/1967 | Lappin | 260/45.85 |
| 3,442,838 | 5/1969 | Hoshi | 260/45.75 X |
| 3,445,396 | 5/1969 | Funatsu et al. | 260/92.8 |
| 3,499,856 | 3/1970 | Funatsu et al. | 260/23 |
| 3,546,161 | 12/1970 | Wolheim | 260/45.9 |

*Primary Examiner*—Murray Tillman
*Assistant Examiner*—T. Pertilla

[57] ABSTRACT

Disclosed is an antistatic agent composition for incorporation in synthetic resins comprised of a blend of a. a zinc salt of a $C_{8-22}$ fatty acid or a mixture of a zinc salt of a $C_{8-22}$ fatty acid and a calcium salt of a $C_{8-22}$ fatty acid, and b. a tertiary amine component selected from the group consisting of those represented by the formulas

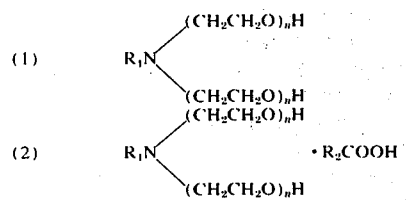

or 3. a mixture of tertiary amines (1) or (2) with a higher aliphatic alcohol represented by the general formula $R_3OH$ where each $R_1$, $R_2$, and $R_3$ is independently selected from the group consisting of alkyl and alkenyl radicals containing from about 8 to 22 carbon atoms and $n$ is a number of from 1 to 5.

1 Claim, No Drawings

ANTISTATIC AGENT COMPOSITION

This invention relates to an antistatic agent composition which is effective as such when incorporated in synthetic resins. More particularly, the present invention relates to an antistatic agent which is effective as such when incorporated in synthetic resins and which, when incorporated into such synthetic resins, does not tend to cause discoloration or degradation thereof.

Because of their high electrical resistance, thermoplastic materials readily acquire and do not easily dissipate static electrical charges. High electrostatic charge produces problems such as dust attraction which lowers consumer appeal of items packaged in the plastic. Static causes backlashes and jamming of films in automatic packaging machines. Static can cause sparks which annoy persons handling film and can initiate fires and explosions.

The plastics processing industry combats static by one of two ways. Chemicals can be coated onto the plastic's surface to render it electrically conductive so that electrostatic charges are dissipated as they are formed. Alternatively, these chemicals may be added to the plastic prior to a melt processing step such as extrusion, calendering or compounding. During processing, the additive becomes intimately mixed with the plastic compound. After processing, it migrates or exudes to the plastic's surface to form the conductive coating. The former approach has the disadvantage of impermanence since the coating (thus the static protection) is lost if the plastic's surface is wiped. With the latter approach of internal additives if the surface is wiped, additional additive migrates from within the plastic to restore the coating.

A number of very effective antistats cannot be used as antistatic internal additives because they lack the stability to withstand plastic processing conditions (which are roughly 170°–230°C. and 2–20 minutes depending on the polymer), or they catalyze the degradation of the polymer itself (particularly in the case of polyvinyl chloride). Quaternary ammonium compounds are recognized as one of the most effective types of antistats. However, their poor thermal stability limits their use as internal additives. It is also reported that ethoxylated tertiary amines adversely affect the heat stability of polyvinyl chloride resin.

Therefore, it is an object of the present invention to provide an antistatic agent for synthetic resins which can be used as an internal additive and not significantly affect the heat stability of the synthetic resin.

It is another object of the present invention to provide a synthetic resin composition which exhibits antistatic properties and increased thermal stability.

These and other objects of the present invention are accomplished with the utilization of an internal additive antistatic agent composition for synthetic resins comprised of a blend of a. a zinc salt of a $C_{8-22}$ fatty acid or a mixture of a zinc salt of a $C_{8-22}$ fatty acid and a calcium salt of a $C_{8-22}$ fatty acid, and b. a tertiary amine component selected from the group consisting of those represented by the formulas

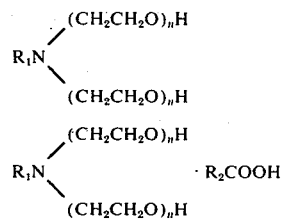

or 3. a mixture of tertiary amines (1) or (2) with a higher aliphatic alcohol represented by the general formula $R_3OH$ where each $R_1$, $R_2$, and $R_3$ is independently selected from the group consisting of alkyl and alkenyl radicals containing from about 8 to 22 carbon atoms and $n$ is a number of from 1 to 5.

It has been found that by incorporating an effective amount of an internal antistatic agent of the present invention in synthetic resins, for example, polyvinyl chloride homopolymers, polyvinyl chloride copolymers, such as vinyl chloride-vinyl acetate copolymers, polyethylene, and polypropylene, a synthetic resin composition is obtained which exhibits excellent antistatic properties.

A preferred group of antistatic compounds illustrated by the above formulas as those where each $R_1$, $R_2$, and $R_3$ is independently octyl, capryl, decyl, cetyl, myristyl, stearyl, lauryl, oleyl, octenyl, or dodecenyl.

Among the tertiary amine compounds which can be used in the subject blend are, for example, N,N'-bis(2-hydroxyethyl) stearylamine; N,N'-bis[polyoxyethylene(5)]stearylamine; N,N'-2-hydroxyethyl stearylamine oleate; N,N'-bis[polyoxyethylene(3)] octylamine stearate; N,N'-bis[polyoxyethylene(4)]laurylamine laurate; N,N'-bis[polyoxyethylene(5)]laurylamine; N,N'-bis(2-hydroxyethyl)cetylamine; N,N'-bis[polyoxyethylene(3)]stearylamine; N,N'-bis[polyoxyethylene(5)]decylamine; N,N-bis[polyoxyethylene(4)]octylamine; N,N-bis(2-hydroxyethyl)dodecylamine; N,N-bis(2-hydroxyethyl)stearylamine stearate; and N,N-bis[polyoxyethylene(5)]cetylamine octoate.

Among the higher aliphatic alcohols which can be used in the subject antistatic compositions are, for example, myristyl alcohol, octyl alcohol, stearyl alcohol, capryl alcohol, lauryl alcohol, and cetyl alcohol.

The general formula indicated as (2) above represents quaternary ammonium salts which are prepared by known processes involving reacting about one mole of carboxylic acid with about one mole of suitable tertiary amine so as to bring about the formation of the corresponding ammonium salt. For example, among the carboxylic acids that can be used to prepare these salts are stearic acid, decylenic acid, oleic acid, caprylic acid, and myristic acid.

The zinc and calcium salts of $C_{8-22}$ saturated and unsaturated fatty acids used in the subject compositions include salts such as, for example, zinc octoate, zinc laurate, zinc stearate, calcium stearate, and calcium oleate. Preferably, when a combination of a zinc salt and calcium salt such as zinc stearate and calcium stearate is utilized the lowest weight ratio of zinc salt to calcium salt used is at least about 4:1 respectively. Obviously, there is no upper limit to this ratio inasmuch as zinc salt can be used singularly. In a more preferred embodiment of the present invention, in view of obtaining optimum results, a mixture of zinc stearate and calcium stearate is used wherein the lowest weight ratio of zinc stearate to calcium stearate is at least 5:1 respectively.

In general, the antistatic agent compositions of the present invention are composed of blends of component (a), which is a zinc or calcium salt of a fatty acid or blend thereof as defined hereinabove, and component (b), which is an ethoxylated tertiary amine as defined hereinabove, at a weight ratio of from about 1:30 to 2:1 respectively. In a more preferred embodiment of the present invention, blends of component (a) and component (b) are used at a weight ratio of from about 1:10 to 1:1 respectively.

In the antistatic agent compositions of the present invention, when component (b) is a mixture of a tertiary amine, (1) or (2) [as illustrated by chemical structures herein] and a higher aliphatic alcohol, the tertiary amine component and higher aliphatic alcohol are utilized at a weight ratio of from about 4:1 to 1:1 respectively. However, in view of optimum results, it is more preferred to utilize a mixture of tertiary amine (1) or (2) and a higher aliphatic alcohol at a weight ratio of from about 2:1 to about 1.3:1 respectively.

The antistatic agent compositions of the present invention are prepared by merely combining components (a) and (b) and then thoroughly mixing same at room temperature so as to obtain a homogeneous blend thereof. Any type of suitable commercially available mixing apparatus can be used for this purpose or it can be done by hand if the batch is sufficiently small.

The antistatic agent composition blend of the present invention is generally used at concentrations ranging from about 0.2 to 10 parts by weight per hundred parts by weight of resin; however, any concentration can be used so long as it is an effective amount. In view of the cost of materials and the obtainment of optimum results, a more preferable range for utilization of the subject antistatic agent composition is from about 1 to 5 parts by weight per hundred parts by weight of resin.

The vinyl resin materials used in the present invention include polyvinyl chloride and copolymers and mixtures of homopolymers thereof. Examples of other copolymers that may be used are those of vinyl chloride with $C_{1-8}$ alkyl esters of alpha-unsaturated aliphatic acids having 3 to 5 carbon atoms to the molecule of said acid. Examples of these alkyl esters include methyl, ethyl, and octyl acrylate and methacrylate. The homopolymer, polyvinyl chloride and copolymers and mixtures of homopolymers wherein the vinyl chloride moiety is present in major proportions give satisfactory films such as for wrapping meats or the like.

The present resin formulations may also include a conventional plasticizer, i.e., substantially nonvolatile solvents that are chemically inert to the resin, as for vinyl resins, for example, di(2-ethylhexyl)adipate, acetyl tributylcitrate, epoxidized soybean oil, butyl phthalyl butyl glycolate, diisobutyl adipate, diphenyl(2-ethylhexyl)phosphate, butyl benzyl phthalate, and the like and mixtures thereof. The total plasticizer concentrate for vinyl resins which may be used for film manufacturing should generally be between about 20 to 60 parts by weight of plasticizer for 100 parts by weight of vinyl resin and preferably between 30 to 50 parts of plasticizer per hundred parts of vinyl resin.

When speaking of thermal stability, it must be realized that there are two aspects of thermal stability, one being "heat stability time" and the other being "color stability." Heat stability time is a measure of the process of resin degradation which, for example, is caused by crosslinking of adjacent polyvinyl chloride molecules resulting in a loss of some desired properties. Additionally, the heat stability time defines the processing time limits for the resin compound. Color stability is an indication of absence of color which is a requirement in many resin applications, e.g., plasticized polyvinyl chloride meat wrap. Color stability is independent of heat stability time, and there is no general correlation between the two. For instance, many surfactants that increase the polyvinyl chloride heat stability time cause early discoloration of polyvinyl chloride film. Consequently, when analyzing the data shown in the examples below, heat stability time and color stability must be considered independently to determine the true stabilizing effect of the compounds claimed in this invention.

The resin products of the present invention can be used to prepare films, plastic bottles, plastic piping, and any other type of end product normally prepared from such resin products.

In the preparation of the antistatic synthetic resin compositions of the present invention, the resin, antistatic blend and other additives such as plasticizer are merely all combined, mixed, and then heated sufficiently to soften or melt the resin so that the various additives such as plasticizer antistatic agent and the like can be thoroughly blended throughout the resin material. Such mixing can be accomplished in an extruder prior to extrusion into the desired end product such as a film.

The following examples illustrate the longer processing lifetimes that can be built into resins by the use of the subject antistatic agent compositions which in addition also lower the propensity of the resulting resin blend and products thereof to acquire electrostatic charges. All parts are by weight in all of the following examples unless specifically indicated otherwise.

In the following Examples 1–14, stability testing was conducted with a C. W. Brabender Plasti-Corder equipped with a type 5 roller mixing head. Use of this instrument for measuring heat stability is well documented in the literature. Dry blends of the formulations shown in the examples below were prepared on a Henschel-Prodex Model 2JSS intensive mixer. About 40.0 cc of the resulting mixture was charged into the mixing head of the Plasti-Corder, which was maintained at a temperature of about 180°C. The Brabender Plasti-Corder was operated at a head speed of 40 revolutions per minute.

The Plasti-Corder is capable of recording the torque involved in mixing the polyvinyl chloride compound in the mixing head. After the polyvinyl chloride fuses and melts, an equilibrium condition is established whereby the melt torque and temperature are constant. When crosslinking of the polyvinyl chloride molecules occurs, there is a very noticeable, sharp increase in the torque. The elapsed time until this increase occurs is the heat stability time.

Color stability results indicated in the following tables were measured through the use of the Gardner Color Standards for Liquids, permanent (1953 series)

manufactured by Gardner Laboratories, Inc., Bethesda, Md. The color standards are progressively darker from 1 (nearly colorless) to 18 (dark amber). Pill-shaped samples approximately ¼ inch in diameter and 1/16 inch thick were pulled from the Brabender mixing head at the time intervals indicated in the examples below and compared to the Gardner Color Standards. In this way, the beneficial effect of the compounds claimed in this invention on the resin color was observed. "Time in minutes to a 5 color" as recorded in several of the examples was chosen because this value indicates a noticeable change in color (to light yellow). However, while a color greater than 5 may not be acceptable for some uses, it may be acceptable for other uses, for example, such as in the manufacture of plastic piping and phonograph records.

EXAMPLES 1–6

Antistatic resin compositions were prepared having the following formulation and were evaluated as described above, the results of which are shown in Table I:

| Formulation | |
|---|---|
| Polyvinyl chloride homopolymer | |
| resin (Rucon B-28) | 100 parts |
| Dioctyl adipate | 45 parts |
| Epoxy soybean oil (Paraplex G-62) | 5 parts |
| N,N'-bis(2-hydroxyethyl)stearyl amine stearate | (As shown in Table I) |
| Metal stearate | (As shown in Table I) |

TABLE I

| EX. | Tertiary Amine Component | Tertiary Amine PHR* | Metal Stearate Component | Metal Stearate PHR* | Equilibrium Melt Temp. (°C.) | Equilibrium Melt Torque (M-GM) | Heat Stability Time (Min.) | Color Stability Gardner Colors of Samples Pulled After | | | | | | | Time To A 5 Color |
|---|---|---|---|---|---|---|---|---|---|---|---|---|---|---|---|
| | | | | | | | | 3 Min. | 6 Min. | 9 Min. | 12 Min. | 15 Min. | 27 Min. | 90 Min. | |
| 1 | N,N'-bis(2-hydroxyethyl)stearylamine stearate | 0.0 | Zn | 0.3 | 182 | 600 | 15.5 | 2 | 2 | 3 | 4 | 6 | >18 | | 15 |
| 2 | " | 0.15 | Zn | 0.15 | 178 | 570 | 32.0 | 2 | 2 | 2 | 3 | 4 | 8 | >18 | 18 |
| 3 | " | 0.3 | — | 0.0 | 181 | 530 | >120 | 2 | 3–4 | 6 | 7 | 9 | 16 | 17 | 9 |
| 4 | " | 0.15 | Ca/Zn 1:8** | 0.15 | 180 | 550 | 34.0 | 2 | 3 | 3–4 | 4 | 5 | 10 | >18 | 15 |
| 5 | " | 0.0 | Ca/Zn 1:8** | 0.3 | 179 | 590 | 18.0 | 2 | 3 | 4 | 5 | 6 | >18 | | 12 |
| 6 | " | 1.0 | Zn | 0.3 | 180 | 550 | 68.0 | 2 | 3 | 3–4 | 4 | 4 | 6 | >18 | 18 |

*PHR - Parts per hundred parts resin by weight.
**Ratio based on metal content.

EXAMPLES 7–10

Antistatic resin compositions were prepared having the following formulation and were evaualted as described above, the results of which are shown in Table II:

| Formulation | |
|---|---|
| Polyvinyl chloride homopolymer (Pliovic K906) | 100 parts |
| Dioctyl adipate | 35 parts |
| Epoxy soybean oil (Paraplex G-62) | 10 parts |
| Triphenyl phosphite | 1.0 part |
| Stearic acid | 0.5 part |
| Tertiary amine | (As shown in Table II) |
| Metal salt | (As shown in Table II) |

TABLE II

| EX. | Tertiary Amine Component | Tertiary Amine PHR* | Metal Stearate Component | Metal Stearate PHR* | Equilibrium Melt Temp. (°C.) | Equilibrium Melt Torque (M-GM) | Heat Stability Time (Min.) |
|---|---|---|---|---|---|---|---|
| 7 | None | — | Ca/Zn 1:8** | 0.3 | 195 | 700 | 26.0 |
| 8 | N,N'-bis(2-hydroxyethyl) tallow amine | 2.0 | Ca/Zn 1:8** | 0.3 | 196 | 510 | 75.5 |
| 9 | N,N'-bis(2-hydroxyethyl) tallow amine stearate | 2.0 | Ca/Zn 1:8** | 0.3 | 196 | 510 | 86.3 |
| 10 | N,N'-bis(2-hydroxyethyl) stearyl amine stearate/ stearyl alcohol (67:33)*** | 2.0 | Ca/Zn 1:8** | 0.3 | 196 | 625 | 80.0 |

TABLE II-continued

| | Color Stability Gardner Colors of Samples Pulled After | | | | | | | | |
|---|---|---|---|---|---|---|---|---|---|
| EX. | 3 Min. | 6 Min. | 9 Min. | 12 Min. | 18 Min. | 24 Min. | 30 Min. | 42 Min. | 54 Min. | 66 Min. |
| 7 | 2 | 2 | 3 | 3 | 6 | 8 | | | | |
| 8 | 2 | 3 | 4 | 5 | 7 | 9 | 11 | 13 | 13 | 18 |
| 9 | 3 | 3 | 4 | 5 | 6 | 7 | 8 | 11 | 12 | 14 |
| 10 | 2 | 3 | 3 | 4 | 5 | 6 | 7 | 10 | 11 | 12 |

*PHR - Parts per hundred parts resin by weight.
**Ratio based on metal content.
***Ratio of N,N-40 -bis(2-hydroxyethyl)stearyl amine stearate to stearyl alcohol.

EXAMPLES 11-14

Antistatic resin compositions were prepared having the following formulation and were evaluated as described above, the results of which are shown in Table III:

| Formulation | |
|---|---|
| Polyvinyl chloride homopolymer (Rucon B-28) | 100 parts |
| Dioctyl adipate | 15 parts |
| Epoxy soybean oil (Paraplex G-62) | 10 parts |
| Triphenyl phosphite | 1.0 part |
| Stearic acid | 0.5 part |
| Tertiary amine | (As shown in Table III) |
| Metal salt | (As shown in Table III) |

TABLE III

| EX. | Tertiary Amine Component | Tertiary Amine PHR* | Metal Stearate Component | Metal Stearate PHR* | Equilibrium Melt Temp. (°C.) | Melt Torque (M-GM) | Heat Stability Time (Min.) |
|---|---|---|---|---|---|---|---|
| 11 | None | — | Ca/Zn 1:8** | 0.3 | 197 | 905 | 17.8 |
| 12 | N,N'-bis(2-hydroxyethyl)tallow amine | 2.0 | Ca/Zn 1:8** | 0.3 | 197 | 615 | 41.4 |
| 13 | N,N'-bis(2-hydroxyethyl)tallow amine stearate | 2.0 | Ca/Zn 1:8** | 0.3 | 197 | 650 | 48.6 |
| 14 | N,N'-bis(2-hydroxyethyl)stearyl amine stearate/stearyl alcohol (67/33)*** | 2.0 | Ca/Zn 1:8** | 0.3 | 197 | 740 | 51.9 |

| | Color Stability Gardner Colors of Samples Pulled After | | | | | | | | | |
|---|---|---|---|---|---|---|---|---|---|---|
| EX. | 3 Min. | 6 Min. | 9 Min. | 12 Min. | 18 Min. | 24 Min. | 30 Min. | 42 Min. | 54 Min. | 66 Min. |
| 11 | 2 | 3 | 4 | 5 | >18 | | | | | |
| 12 | 3 | 4 | 5 | 7 | 10 | 11 | 14 | >18 | | |
| 13 | 3 | 4 | 5 | 6 | 8 | 11 | 13 | 15 | | |
| 14 | 2 | 4 | 4 | 6 | 7 | 10 | 10 | 13 | | |

*PHR - Parts per hundred parts resin by weight.
**Ratio based on metal content.
***Ratio of N,N'-bis(2-hydroxyethyl)stearyl amine stearate to stearyl alcohol.

The resin compositions in Tables I to III containing the antistatic composition blends of the present invention when tested exhibit excellent antistatic properties.

Having thus described my invention, I claim:

1. An antistatic synthetic resin composition comprising a polyvinyl chloride homopolymer resin and an effective amount of a blend of
   a. zinc stearate and
   b. a blend of N,N'-bis(2-hydroxyethyl) stearylamine stearate and stearyl alcohol wherein the ratio by weight of said stearylamine to stearyl alcohol is from about 4:1 to 1:1.

* * * * *

UNITED STATES PATENT AND TRADEMARK OFFICE
CERTIFICATE OF CORRECTION

PATENT NO. : 3,975,325
DATED : August 17, 1976
INVENTOR(S) : William Penuel Long, Jr.

It is certified that error appears in the above-identified patent and that said Letters Patent are hereby corrected as shown below:

Column 6, line 32, "evaulated" should read -- evaluated --.

Column 7, Table II, "*Ratio of N,N-40-bis" should read -- *Ratio of N,N'-40-bis --.

Signed and Sealed this second Day of August 1977

[SEAL]

Attest:

RUTH C. MASON
Attesting Officer

C. MARSHALL DANN
Commissioner of Patents and Trademarks